Feb. 16, 1937. J. W. McDONNELL 2,070,743
ELECTRICAL INDICATING APPARATUS
Filed April 12, 1933
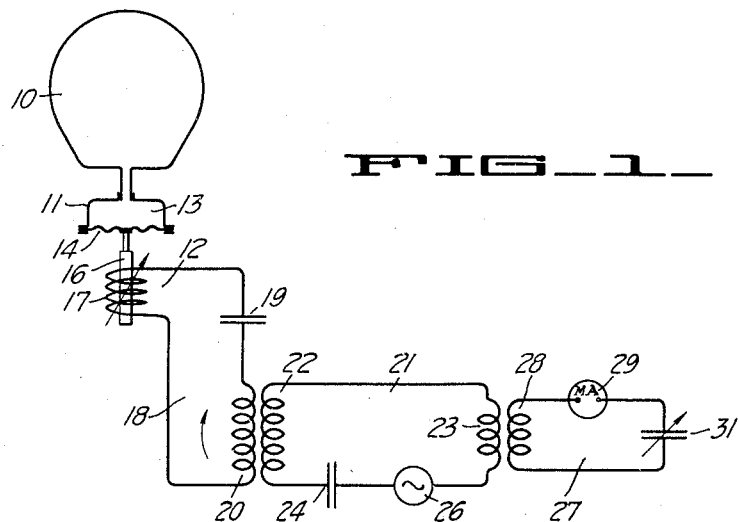
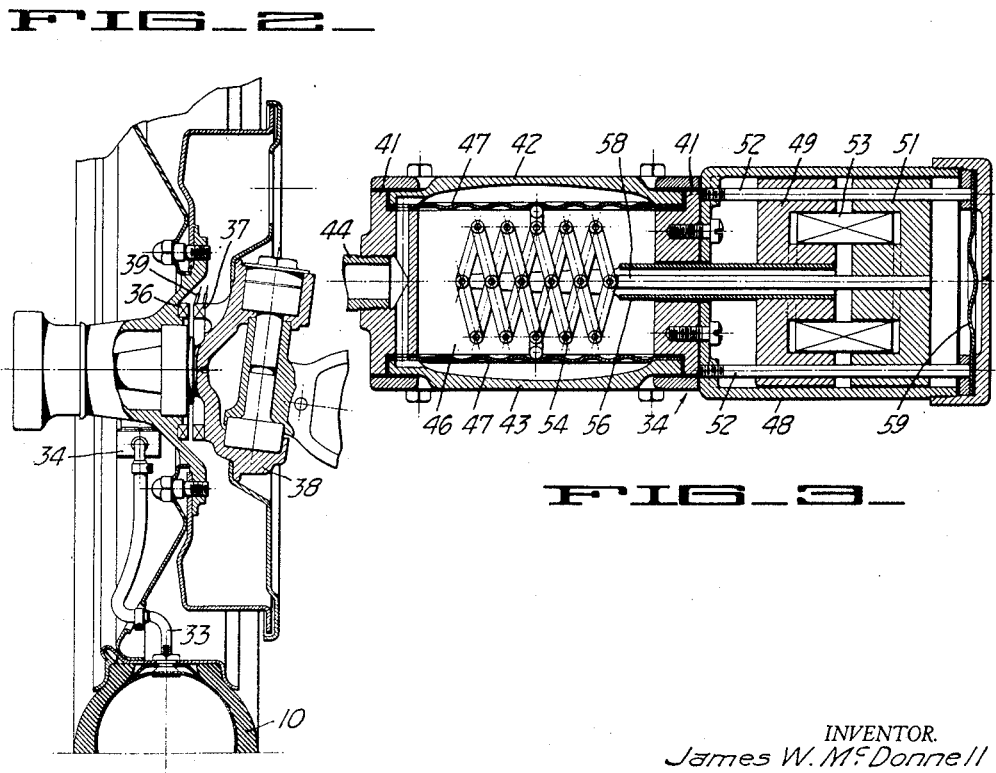
INVENTOR.
James W. McDonnell
BY
White, Prost, Fehr & Lothrop
ATTORNEYS.

Patented Feb. 16, 1937

2,070,743

UNITED STATES PATENT OFFICE 2,070,743

ELECTRICAL INDICATING APPARATUS

James W. McDonnell, Palo Alto, Calif.

Application April 12, 1933, Serial No. 665,707

2 Claims. (Cl. 177—351)

This invention relates generally to electrical apparatus for indicating the pressure of pneumatic tires, and which will make available a reading of the tire pressure from the instrument panel of a motor vehicle, while the vehicle is in motion.

It is an object of the invention to provide an apparatus of the above character, which will obviate the necessity of direct mechanical or electrical connections between the parts of the apparatus carried by the wheels of the vehicle, and the stationary parts carried by the vehicle body.

A further object of the invention is to provide a tire pressure indicating apparatus which will be relatively accurate and reliable, and which can be employed to obtain either continuous or intermittent indications.

Further objects of the invention will appear from the following description in which the preferred embodiment of the invention has been set forth in detail in conjunction with the accompanying drawing.

Referring to the drawing:

Figure 1 is a diagrammatic view, illustrating apparatus incorporating the present invention.

Fig. 2 is a detailed cross-sectional view, illustrating an arrangement which can be employed in practice for adapting my apparatus to an automotive wheel of standard construction.

Fig. 3 is a cross-sectional detail, illustrating that part of my apparatus which is intended to be connected to a pneumatic tire, to provide a reactive electrical impedance which is varied in accordance with the tire pressure.

Referring first to Fig. 1 of the drawing, I have indicated pneumatic tire 10, the pressure of which it is desired to indicate. A connection is shown between this tire and a pressure responsive device 11, which serves to vary or control an inductance 12 or equivalent reactive impedance. Device 11 in this instance has been shown as comprising a chamber 13, having a connection with the tire 10, and having its one wall formed by a flexible diaphragm 14. Diaphragm 14 is shown connected to a movable magnetic core 16, which is associated with a coil 17, to form the variable inductance 12. Winding 17 is shown included in an oscillatory circuit 18, this circuit also including a capacitance 19, and an inductance 20.

The parts described above are intended to be mounted upon an automobile wheel, to rotate therewith. Certain of the parts which are to be mounted upon the automobile body, have been represented as forming a separate oscillatory circuit 21. This circuit includes an inductance 22, which is coupled to the inductance 20, an external inductance 23, and a capacitance 24. The circuit 21 is adapted to be excited by an oscillator 26, or other suitable source of alternating or oscillatory electrical current. Coupled to the circuit 21, there is a suitable wave-meter 27. This wave-meter may consist of an inductance 28, coupled to inductance 23, together with an electrical energy measuring instrument 29 and a condenser 31. Instrument 29 may be a hot wire ammeter or other suitable device which will properly measure the oscillatory electrical energy available.

Assuming that the oscillator 26 is continuously supplying alternating current to the circuit 21, since circuit 18 is coupled to the same thru inductances 20 and 22, the tuning of this circuit 18 will affect tuning of circuit 21. Therefore the oscillatory energy supplied to circuit 21 can be made to vary in accordance with the tuning of circuit 18. Since the tuning of circuit 18 is controlled by a variation of the inductance 12, and since the value of this inductance is in turn dependent upon the pressure of the tire 10, the oscillatory current supplied to circuit 21, and in turn the indication secured from the wave-meter 27, will be in accordance with the pressure of the tire. When the constants of the electrical circuit have been properly adjusted to secure a proper range of variations for the wave-meter in response to the range of variation of tire pressures for which indications are desired, it is a simple matter to calibrate the apparatus, so that the indications secured from the wave-meter can be translated into terms of tire pressure.

It is apparent that my apparatus has many desirable characteristics. Since energy is transferred between the circuits 21 and 18 thru the relatively rotatable coupled inductances 20 and 22, no directly connected electrical or mechanical connections are required between the wheel of the vehicle and the parts mounted upon the vehicle body, and no sliding electrical contacts are required. No great amount of oscillatory energy is necessary and the oscillator can be of the vacuum tube type, excited with direct current potentials such as are available on most vehicles. The indication can be continuous as long as the vehicle is in operation, or made for intermittent operation whenever the operator desires an indication.

In the arrangement of Fig. 1, I have indicated an oscillator supplying alternating current to circuit 21 at a substantially fixed frequency. It is obvious however that with common types of oscillators, tuning of circuit 21 may react upon the oscillator, to vary the oscillatory energy generated, to vary the frequency, or both, in which event these variable factors will likewise act upon the wave-meter 27, to secure a variation in the indication. It is of course evident that the circuits 18 and 21 should not be sharply tuned, because such operation might not give the desired range of indication. If sharply tuned circuits are employed, then it is still possible to secure an indication of the tire pressure, by noting the setting of condenser 31 to secure the maximum indication for a given tire pressure.

Fig. 2 shows a possible layout for the parts carried by the wheel of an automobile, and for coupling the circuit 18 with the parts carried by the vehicle frame or body. Thus the tire stem 33 in this case is shown connected to a device 34, which has formed in it a pressure responsive means and also a variable reactive impedance corresponding to the variable inductance 12 of Fig. 1. Electrical connections are made from structure 34 to an inductance 36, which is mounted concentric with respect to the axis of the wheel, and in a plane at right angles thereto. Inductance 36 is coupled with respect to an inductance 37, which is carried by the axle structure 38. Conductors 39, leading from inductance 37, form a part of the circuit 21 of Fig. 1. The milliammeter 29 or other indicating instrument of the wave-meter 27, can be conveniently mounted upon the instrument panel of the vehicle. It is of course evident that each of the wheels of the vehicle can be equipped in a manner similar to that explained with respect to Fig. 2, and that individual apparatus can be provided in conjunction with each wheel, for indicating the pressure of the individual tires.

Fig. 3 illustrates a possible detail construction for the device 34, which as has been previously explained, includes the pressure responsive means 11 and variable inductance 12 of Fig. 1. In this case an outer shell 41 has its end closed by plates 42 and 43. Tube 44, which communicates thru the outer shell 41, connects with the tire. Formed within shell 41, there is a closed chamber 46, having flexible diaphragms 47 forming two opposed sides. Air pressure from tube 44 is free to act upon the outer faces of diaphragms 47.

Secured to the shell 41, there is a housing 48, enclosing a pair of magnetic armatures 49 and 51. Both the armatures 49 and 51 are slidably mounted upon guide rods 52, so that they are movable toward or away from each other. A winding 53 is associated with both armatures, and the armatures are so shaped that when they are moved together to closed position, they form in effect a shell-like magnetic core for the winding 53.

For adjusting the relative positioning of armatures 49 and 51, there is shown a phantograph linkage 54, having two intermediate points of connection with the diaphragms 47. One end of this linkage is connected to armature 49 thru a slidable tube 56, and the other end of the linkage is connected to armature 51 thru a slidable rod 58. The entire space within housing 48, and also within the chamber 46, can be filled with oil. One end of housing 48 can be provided with a flexible diaphragm 59, to relieve the pressure within chamber 46 in the event of volumetric changes in the oil, due to temperature variations.

It is evident that armatures 49 and 51 will be moved farther apart, or closer together in accordance with changes in the pressure of the tire. Such changes in the positioning of the armatures, causes a like variation in the reactance afforded by winding 53 in its association with the armatures.

It is evident that in place of a variable inductance, a variable capacitance can be employed. However such an expedient requires a relatively high frequency source of oscillatory current, likewise in place of inductive coupling between the circuits 18 and 21, capacitative coupling can be employed.

I claim:

1. In electrical apparatus for indicating the pressure of pneumatic tires on motor vehicles, an oscillatory circuit carried by a wheel of the vehicle, means responsive to the pressure of the tire on said wheel for varying the tuning of said circuit, means including a source of oscillatory energy carried by the body of the vehicle for indicating variations in said tuning, and means serving to electrically couple the oscillatory circuit with said last means, said coupling means including one inductive element carried by the wheel and another inductive element carried by the body, said elements being spaced with respect to direct electrical contact but being electrically associated for transfer of oscillatory energy.

2. In an electrical apparatus for indicating the pressure of pneumatic tires on motor vehicle wheels, an oscillatory circuit carried by a wheel of the vehicle, means responsive to the pressure of the tire on said wheel for varying the impedance of said circuit, said circuit also including an inductive element carried near the hub of the wheel, a second oscillatory circuit carried by the body of the vehicle, said second circuit including an inductive element disposed near said first inductive element for transfer of oscillatory energy, said inductive elements being spaced with respect to direct electrical contact between them, a source of oscillatory energy carried by the body of the vehicle for supplying electrical oscillations to the second circuit, a third oscillatory circuit, and an oscillation indicator included in said third circuit, said third circuit being coupled to the second circuit for transfer of oscillatory energy.

JAMES W. McDONNELL.